Aug. 14, 1945.   T. R. GAUTIER ET AL   2,382,787
STRIP SERVER
Filed Jan. 9, 1943   11 Sheets-Sheet 1
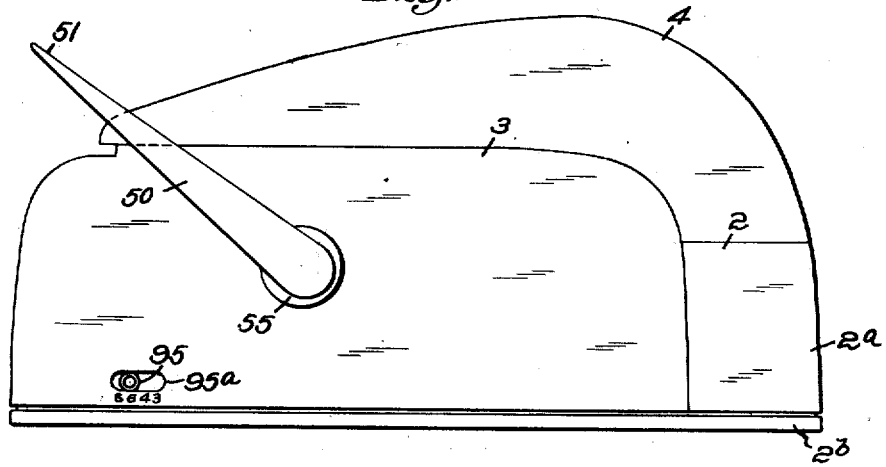
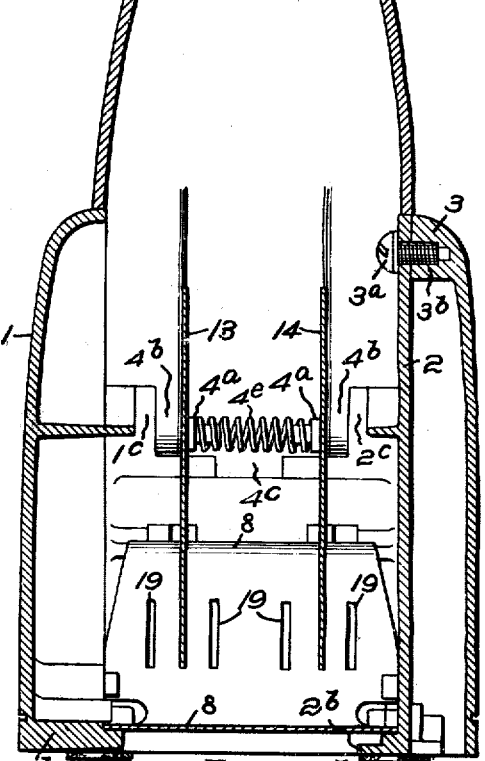

Aug. 14, 1945.　　T. R. GAUTIER ET AL　　2,382,787
STRIP SERVER
Filed Jan. 9, 1943　　11 Sheets-Sheet 2

Inventors:
Trevor R. Gautier,
Robert W. Hoitt,
by Emery, Booth, Townsend, Miller & Widdell
Attys.

Aug. 14, 1945.  T. R. GAUTIER ET AL  2,382,787
STRIP SERVER
Filed Jan. 9, 1943  11 Sheets-Sheet 3

Inventors.
Trevor R. Gautier
Robert W. Hoitt
by Emery, Booth, Townsend, Miller & Widner
Attys

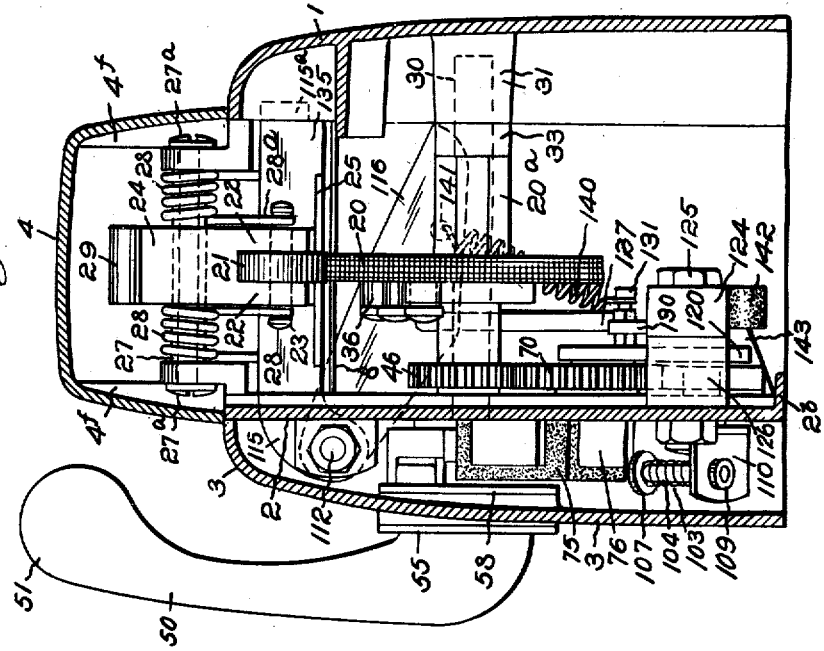

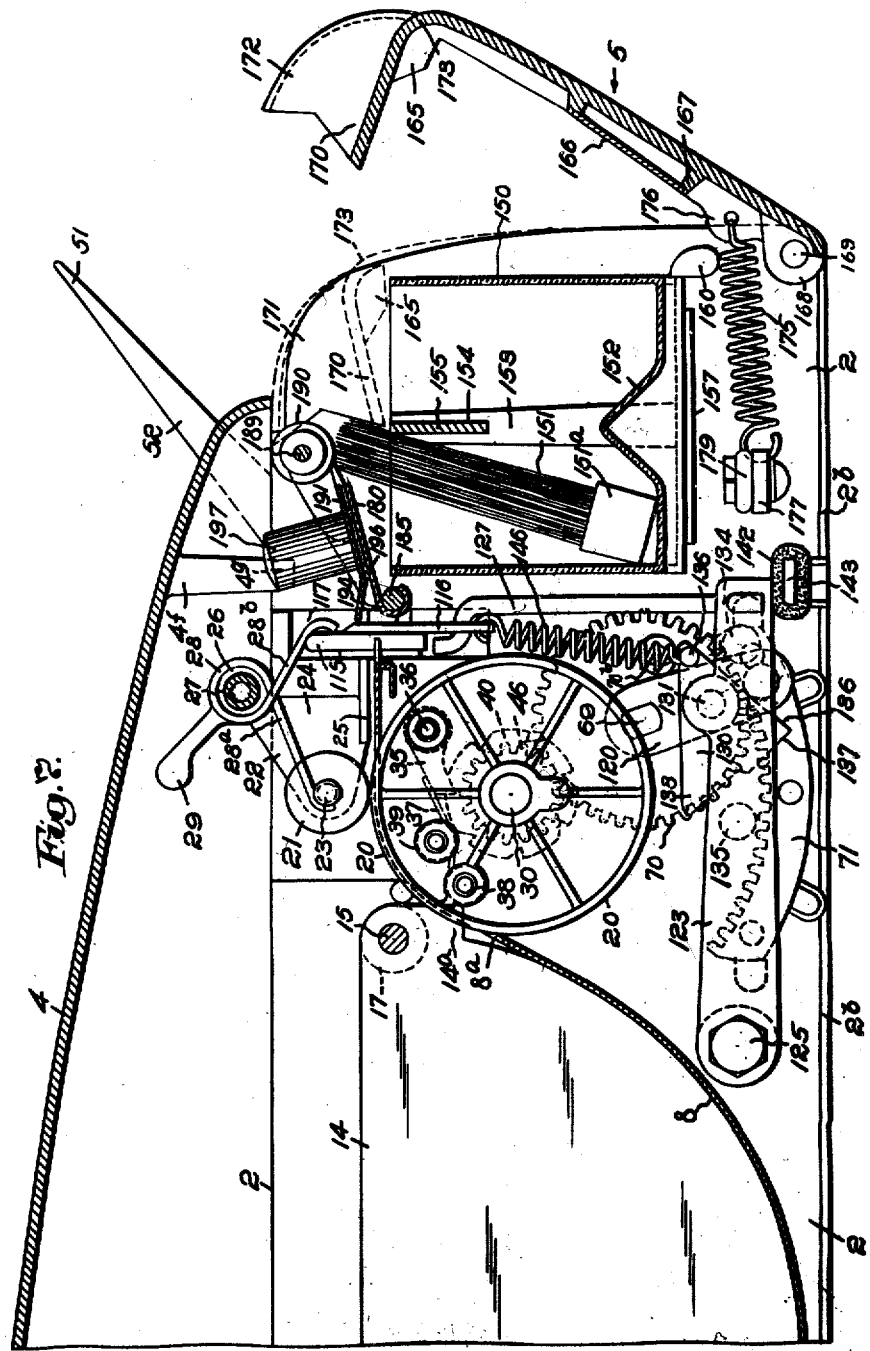

Aug. 14, 1945.  T. R. GAUTIER ET AL  2,382,787
STRIP SERVER
Filed Jan. 9, 1943  11 Sheets-Sheet 6
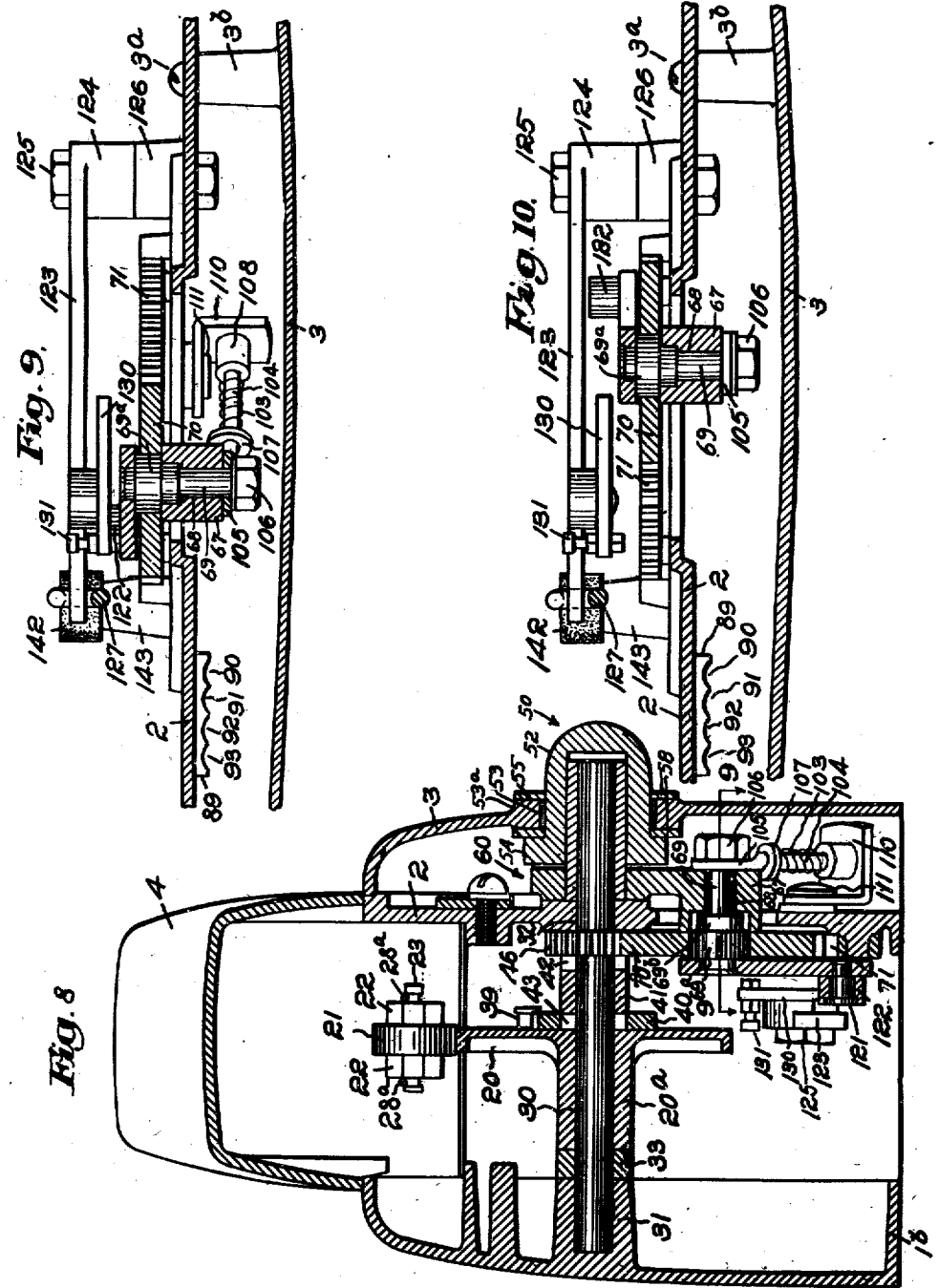
Inventors
Trevor R. Gautier
Robert W. Hoitt
by Emery, Booth, Townsend, Miller & Weidner

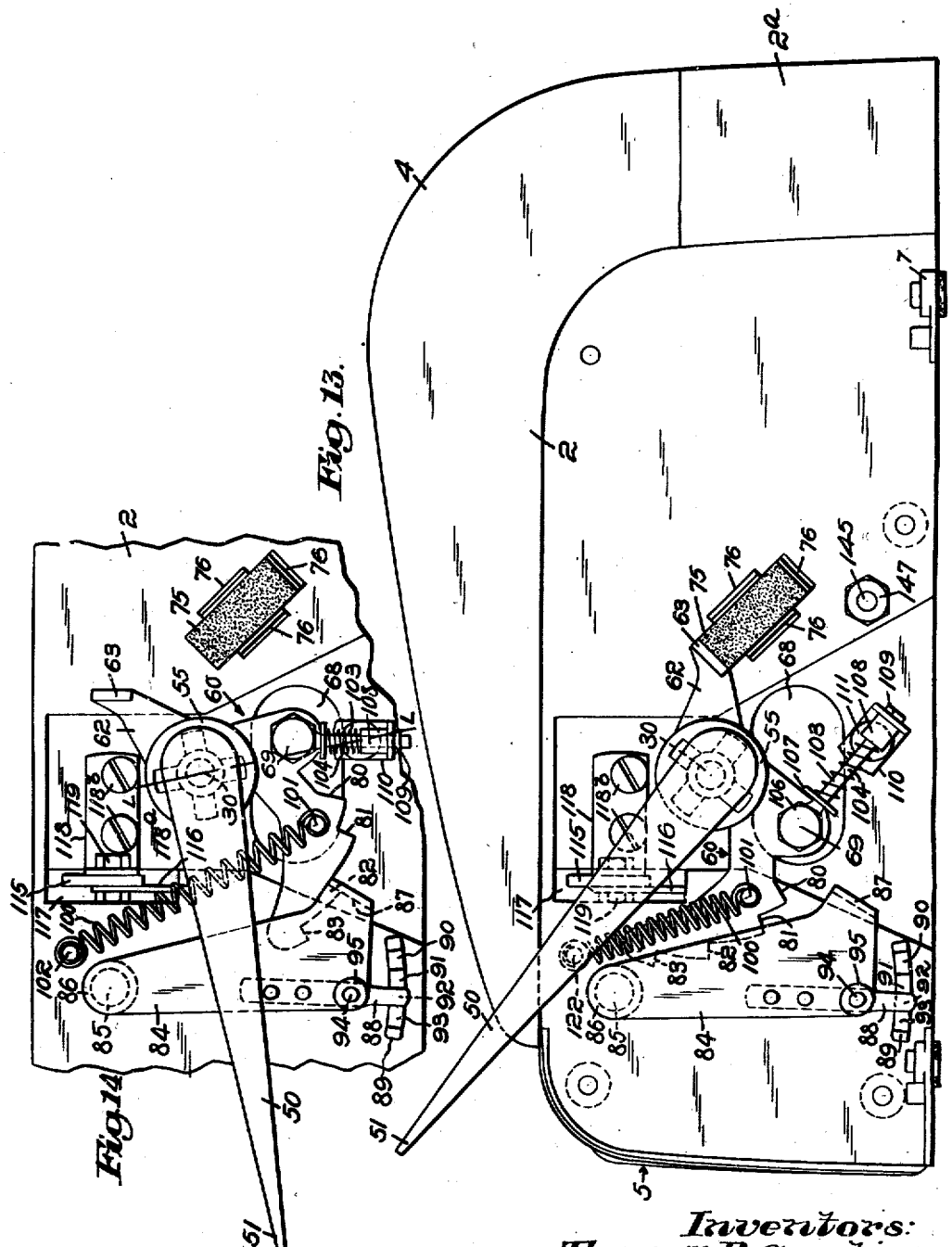

Aug. 14, 1945.  T. R. GAUTIER ET AL  2,382,787
STRIP SERVER
Filed Jan. 9, 1943      11 Sheets-Sheet 8

Inventors:
Trevor R. Gautier
Robert W. Hoiti
by Emery, Booth, Townsend, Miller & Weidell Attys Aug. 14, 1945.  T. R. GAUTIER ET AL  2,382,787
STRIP SERVER
Filed Jan. 9, 1943   11 Sheets-Sheet 9
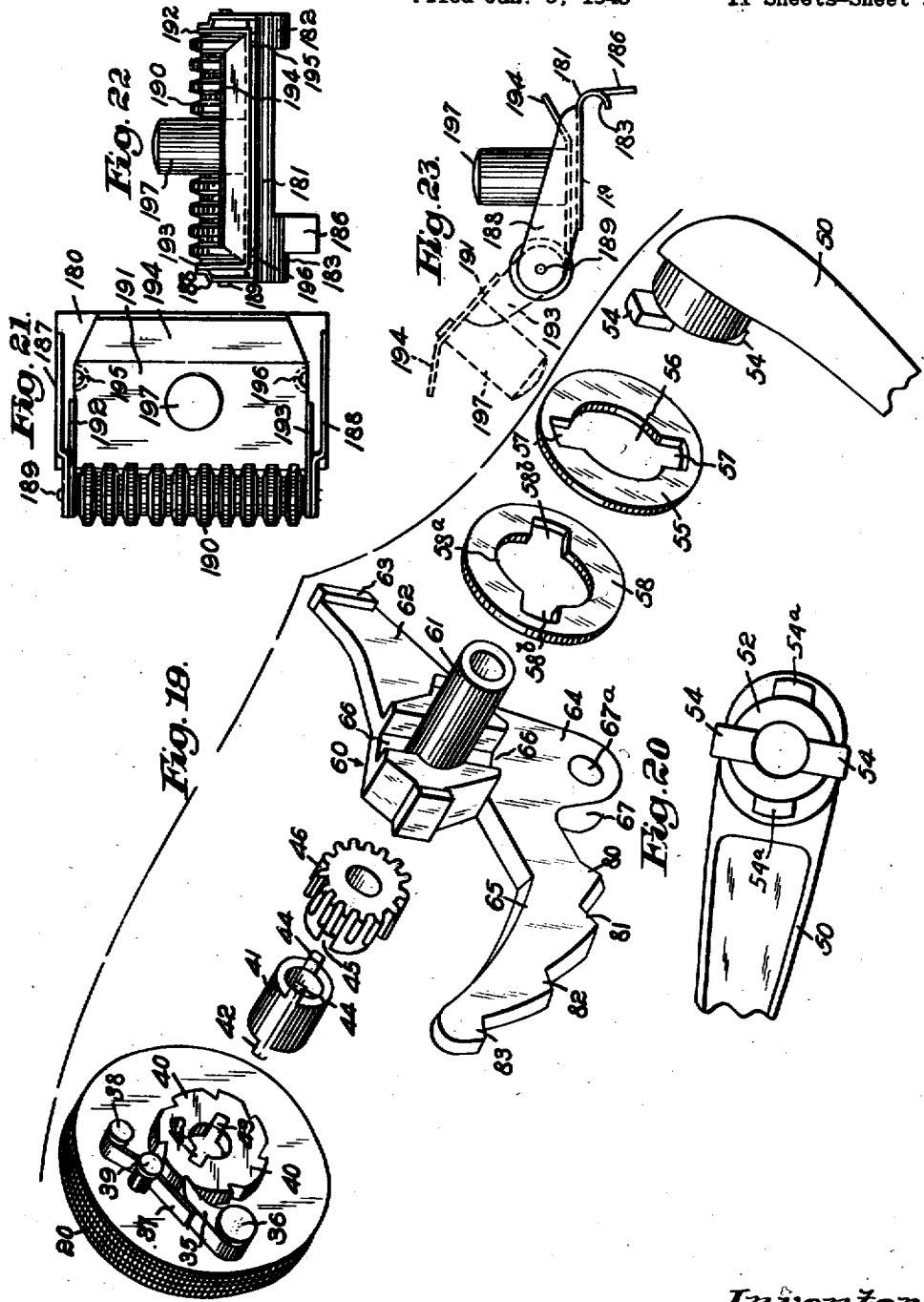
Inventors:
Trevor R. Gautier,
Robert W. Hoitt,
by Emery, Booth, Townsend, Miller & Weidner
Attys

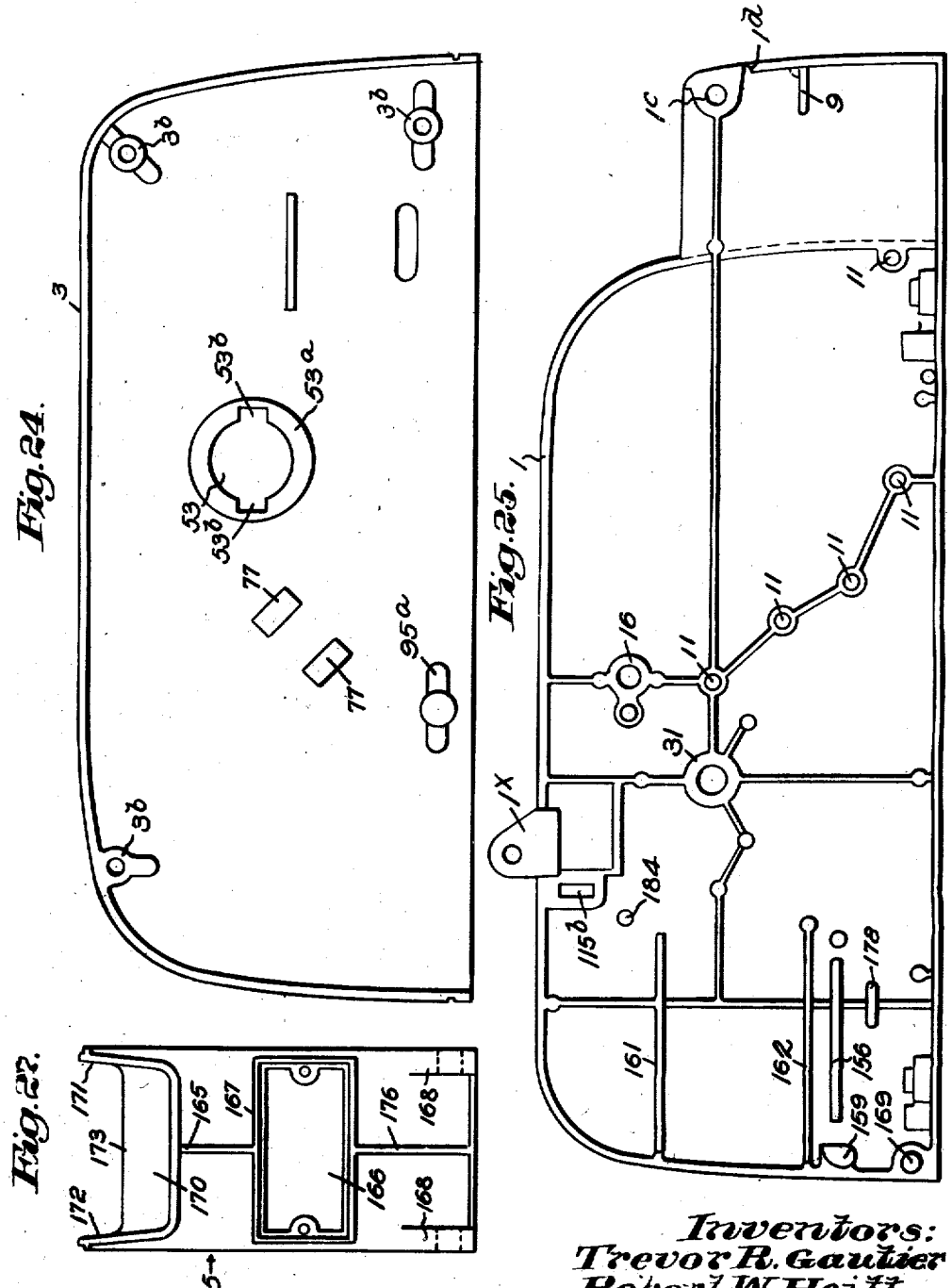

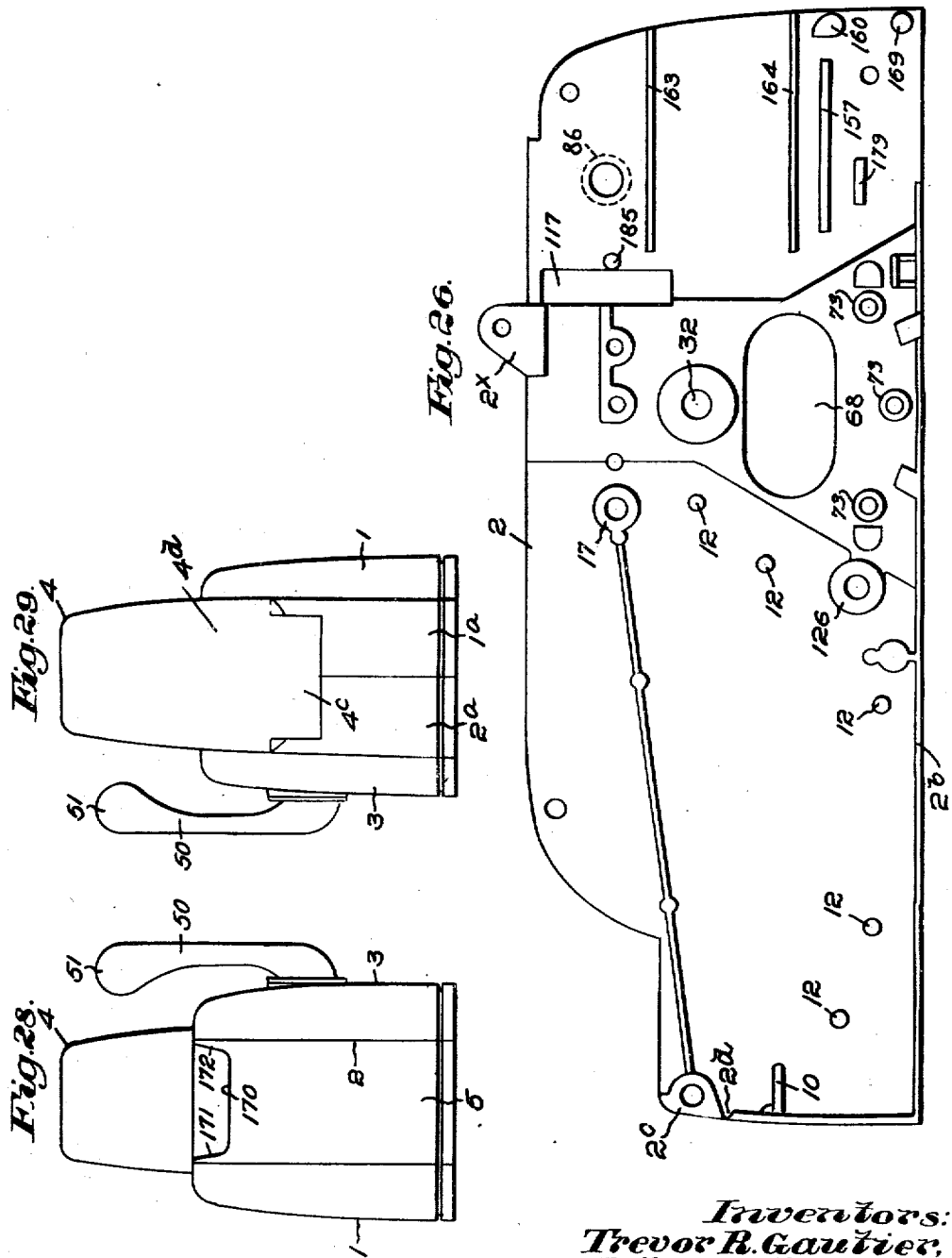

Patented Aug. 14, 1945

2,382,787

UNITED STATES PATENT OFFICE 2,382,787

STRIP SERVER

Trevor R. Gautier and Robert W. Hoitt, Nashua, N. H., assignors to Nashua Gummed and Coated Paper Company, Nashua, N. H., a corporation of Massachusetts Application January 9, 1943, Serial No. 471,890

26 Claims. (Cl. 164—42)

The present invention relates to devices and apparatus for measuring and dispensing selected lengths of adhesive paper and like tape, from supplies of indefinite length, the successive strip lengths being delivered in condition for adhesive affixing for package sealing and other purposes. More particularly the invention aims to provide an extremely compact machine of the class described, of rugged construction and efficient operation, and wherein the actuating parts are protected and concealed in an enclosure having a minimum of projecting parts and presenting an attractive "stream-lined" appearance, rendering the machine appropriate to store counters, office desks and like locations where space saving and pleasing appearance, as well as sturdiness and reliable operation, are important considerations.

In the drawings illustrating by way of example one embodiment of the invention:

Fig. 1 is a side elevation of the machine or device as a whole, on a smaller scale than in the following views;

Fig. 5 is a vertical cross-section on the line 5—5 of Fig. 2 looking toward the rear;

Fig. 6 is a similar section but on the line 6—6 of Fig. 2 and looking oppositely, toward the front;

Figure 2:
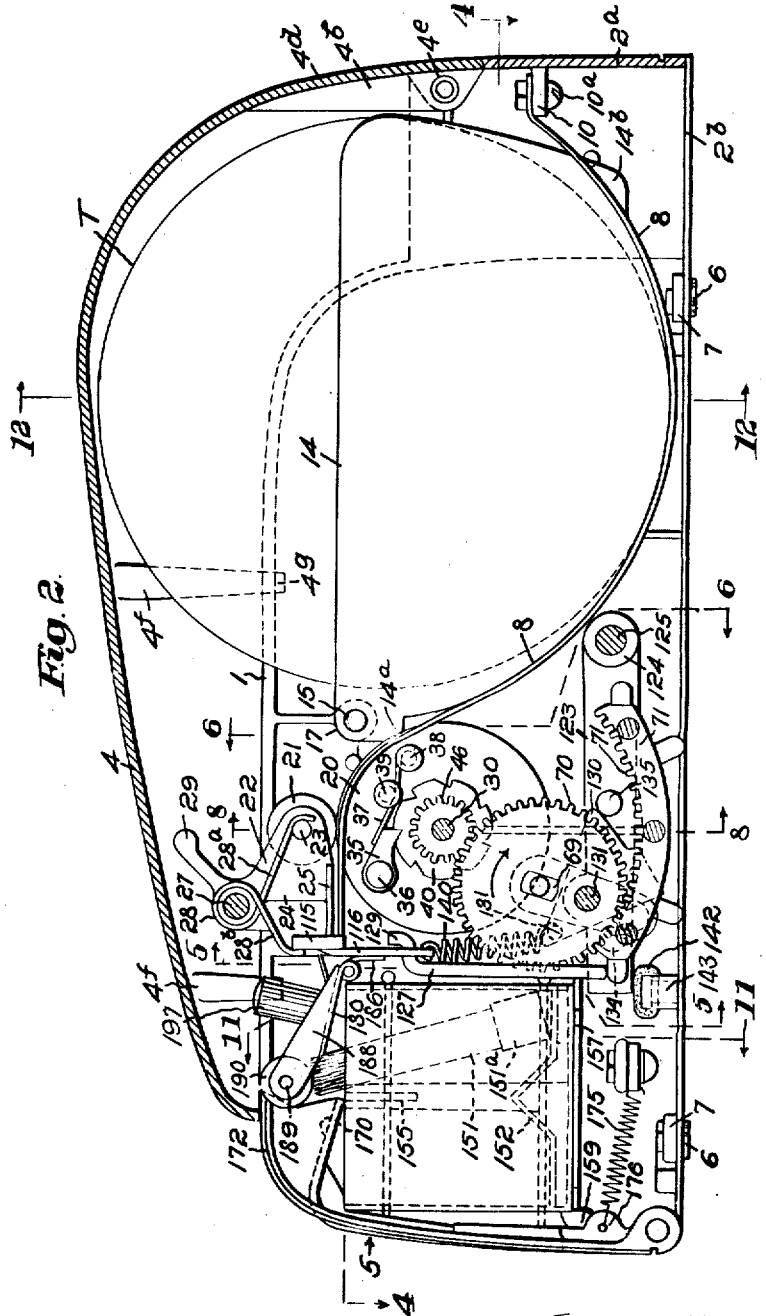
Fig. 2 is a longitudinal vertical section taken just inside the right side frame.
Figure 15:
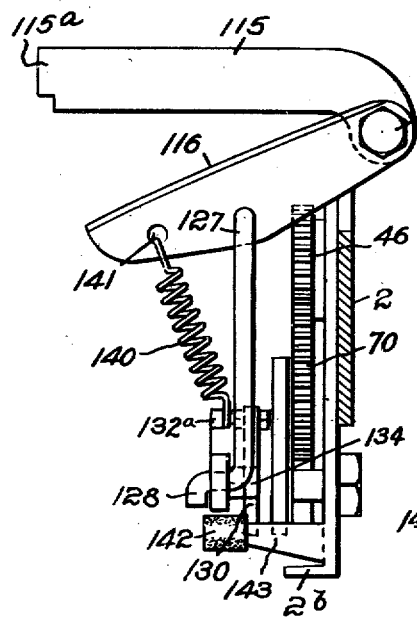
Figure 16:
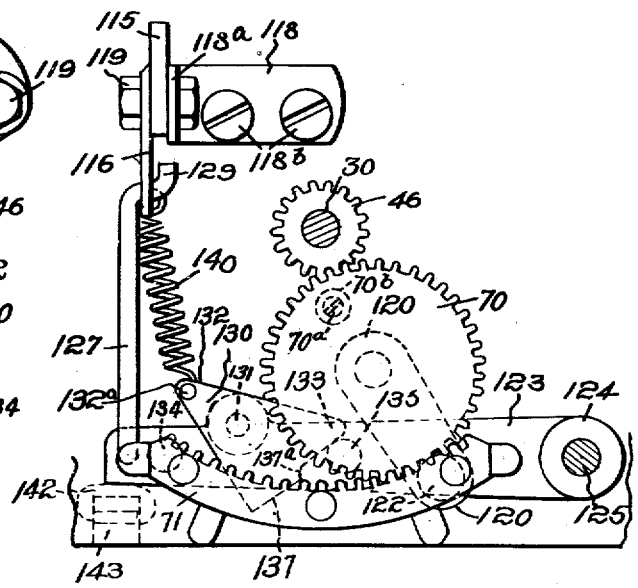
Figure 17:
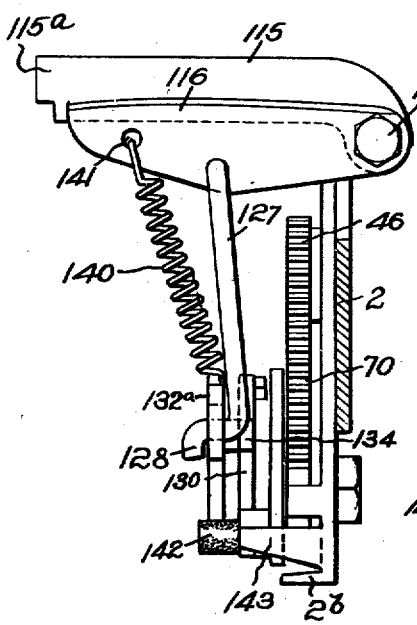
Figure 18:
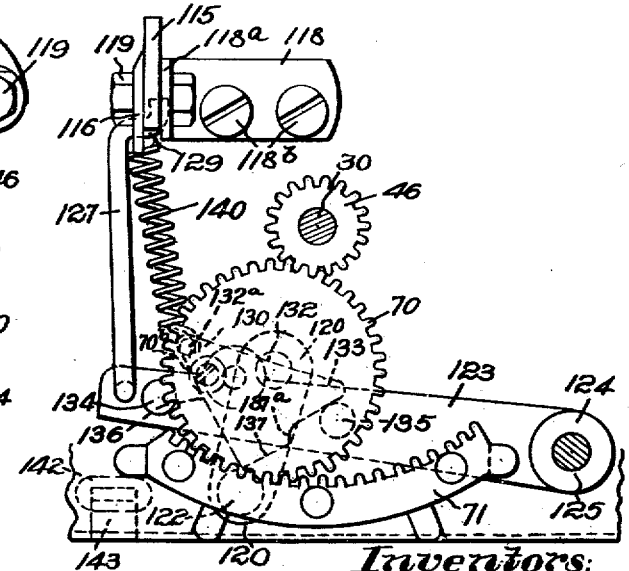

Fig. 7, on a larger scale, is a vertical longitudinal section substantially centrally through the machine, with the rear end broken away;

Fig. 8 is a vertical cross-section on the line 8—8 of Fig. 2, looking to the rear;

Fig. 9 is an enlarged detail section taken horizontally on the line 9—9 of Fig. 8, illustrating a portion of the feed control means, and Fig. 10 is a similar section with the parts differently positioned;

Figs. 11 and 12, on sheet 1, are further vertical cross-sections, Fig. 11 being taken near the front or delivery end of the machine as on the line 11—11 of Fig. 2 and looking forwardly, while Fig. 12 is taken near the rear of the machine as on the line 12—12 of Fig. 2 and looking rearwardly;

Fig. 13 is an elevational view of the right side of the machine, with the outer side plate of the housing removed and with the operating lever demounted from the latter and positioned on its shaft, for explanatory purposes;

Fig. 14 is a fragmental view corresponding to a portion of Fig. 13 showing the measuring and feed control parts in different position;

Figs. 15 and 16 are respectively front and side skeletal views of associated measuring, feeding and cutting elements, as positioned after feeding and measuring but before cutting;

Figs. 17 and 18 are views corresponding to Figs. 15 and 16 respectively, showing the parts as during a cutting operation;

Fig. 19 is an exploded view of elements of the measuring and feeding mechanism;

Fig. 20 shows in side elevation a portion of the inner face of the operating lever;

Figs. 21 to 23 are detail views of a tape feed guide and moistener assembly unit, separately, in plan and in rear and side elevation respectively;

Figs. 24 to 27 are a related series of elevational views of frame or cover elements separately, wherein Fig. 24 shows the inside face of the side cover plate;

Figs. 25 and 26 represent the inner faces of the right and left frames, respectively, and Fig. 27 shows the inner face of the front door or cover;

Fig. 28 is a front end elevation of the machine as a whole, on the scale of Fig. 1; and Fig. 29 is a companion view to Fig. 28, showing the rear end.

Referring to the drawings in more detail, the machine comprises a combined frame and housing seen in full assembly in Fig. 1 and as to its various component elements in the other views. The housing as illustrated comprises two main longitudinal or side frames 1 and 2, a removable side cover plate 3, herein at the right, a top cover 4 and a front closure and delivery table 5, both the latter arranged to be swung open for access to adjacent parts. These several elements of the housing have each an integral one-piece construction, being formed preferably by die casting of a zinc or other metal composition or alloy or by molding of a plastic composition. In this manner the side frames 1 and 2 and the side plate 3 are made to present at their inner faces all the reinforcing ribs, fins and such formations and the various lugs, bosses, projections and the like as appropriate for the mounting and positioning of the operating parts to be described, and for readily and demountably securing togther the housing elements, thus providing a smooth surfaced and pleasing exterior for the resulting portable machine unit.

Noting particularly Figs. 1, 28 and 29, the housing has none of the usual externally visible securing means such as nuts, bolts, screws, clips and the like connections. It is also noted that the side plate 3 is so shaped and correlated with the adjacent frame member 2 as to match externally with the opposite one-piece side frame 1, affording a well-balanced structure of symmetrical and attractive contour as viewed from any angle.

These side frames 1 and 2 are respectively formed with inwardly extended rear ends 1a and 2a adapted to abut laterally in opposed relation to provide an enclosing lower rear wall for the housing. These frames are separably joined by a minimum of interconnections, to be referred to in connection with the various other functions which they serve. Along their lower edges the side frames 1 and 2 are formed with base flanges 1b and 2b provided with cushioning pads 6, 6, etc., of rubber or other resilient composition, desirably recessed at their underface for increased holding effect, and securely set into conforming inverted sockets 7, 7, etc., in the side frame bases.

At the rear portion of the machine, the space between the side frames 1 and 2 and within the overlying portion of the conforming inverted trough-like top cover 4 provides a chamber for a supply of the adhesive tape or strip in roll form, as indicated at T, Fig. 2, positioned in this chamber in readiness to be drawn upon. Such supply roll is supported on a combined floor and under-guide 8 comprising a single piece of metal or other strip material continuous from the rear of the tape supply chamber to and beyond the rotary tape-engaging elements of the feed means to be described. The rear end of this tape support and guide 8 serves as one interconnection for the side frames. For this purpose it is lapped horizontally against projections 9, 10 on the frame rear walls 1a, 2a and there secured as by nuts and bolts 9a, 10a, Figs. 2 and 4. This guide flooring 8 has a width adapting it to space and brace the side frames. It is positioned vertically and also lengthwise by a series of locating nubs 11, 12 projecting from the respective side frames and distributed along the adjacent edges of this guide flooring 8, some below and others above the latter; Figs. 3, 4, 7, 25 and 26.

The top cover 4 extends nearly the full length of the machine. Its front end terminates at and in part defines the delivery station for the moistened measured lengths of tape to be dispensed. This cover is readily removably hinged at the rear of the side frames. The latter have opposed sockets 1c, 2c, Figs. 3, 25 and 26, for horizontal plug-like pivot pins 4a. Noting Figs. 2, 3 and 12, these pins are each of a length to extend through aligned bearing apertures in vertical flanges 4b projecting forwardly from a tongue 4c depending from the base of the rear wall 4d of the cover 4. These pivot pins 4a are of reduced diameter at their inner ends to provide abutment shoulders for the opposite ends of a retaining spring 4e. By merely unseating this spring, the cover pivot pins may be withdrawn inwardly, permitting the cover to be removed bodily and as easily restored. Reinforcing ribs 4f at the inner faces of the cover, Figs. 2 and 7, are projected below its side edges as feet 4g to aid in firmly positioning the cover laterally on the respective side frames. The lower edge of the cover tongue 4c is rounded and the adjacent horizontal upper edges of the frame rear walls 1a, 2a are correspondingly arcuately beveled, as at 1d, 2d, Figs. 25, 26, to provide an overlapping joint in the closed position of the cover 4. The latter is stopped and held in its substantially vertical full-open position by engagement of the outer face of its tongue 4c down upon the top of the frame rear walls 1a, 2a.

Tape rolls of different widths within the capacity of the machine are laterally centered in the supply chamber by means of adjustable side guides or plates 13, 14, Figs. 2 to 4, 7 and 12. These plates are slidably and pivotally mounted at their upper forward portions on a crossbar 15 having its opposite ends removably supported in aligned bosses 16, 17 on the respective frames 1 and 2; see also Figs. 25 and 26. The floor member 8 further serves in positioning these lateral guides 13, 14. For that purpose it has a series of transversely spaced slots 18 at its forward portion, and a corresponding longitudinally aligned rear series of spaced slots 19. The guide plates 13, 14 have down projections 13a, 14a at their forward ends, Figs. 2 and 7, and other depending members 13b, 14b at their lower rear portions, adapted for positioning reception in any selected aligned pair of the forward and rear slots respectively. By lifting the guide plates about their supporting bar their slot-entering portions are disengaged, permitting the plates to be shifted laterally as appropriate for the particular width of tape, such as ¾, 1, 1¼, 1½ inch, etc.

Figure 3:
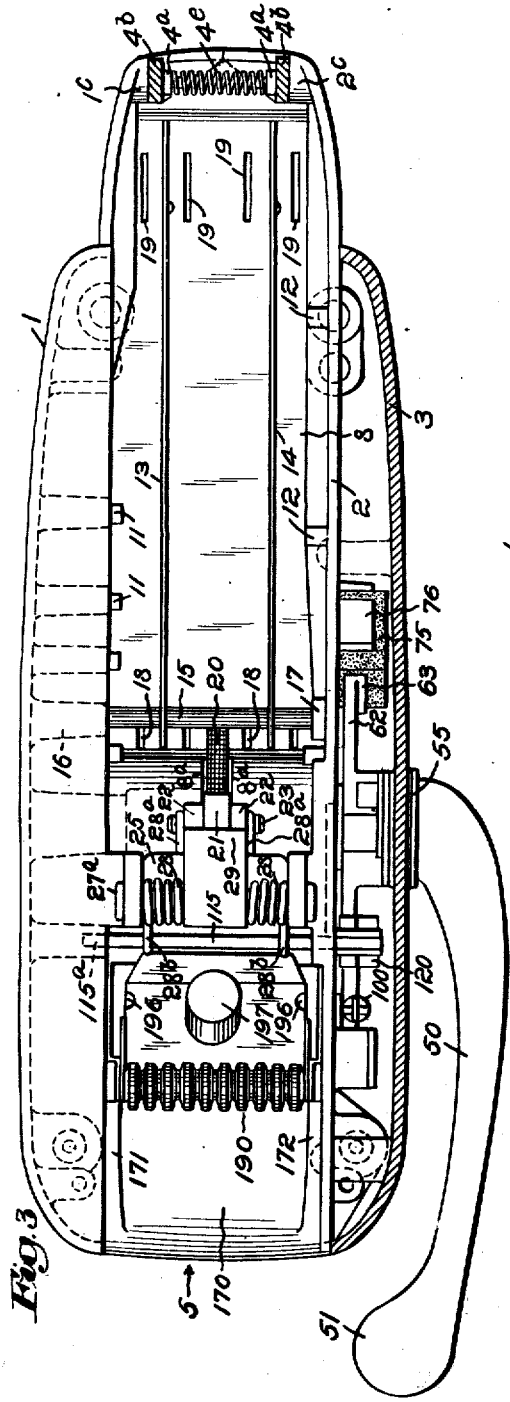
Fig. 3 is a plan, with the cover removed and the right side plate sectioned.

The floor and under-guide 8 also has formed in its forward portion an elongated central slot 8a, Fig. 3, giving access to the underface of the tape by the driven feeding and measuring wheel or roll 20, Figs. 2 to 8 and 19. This lower feed wheel 20 acts in cooperation with an overlying and herein relatively smaller feed wheel or roll 21, to engage, measure out and advance the tape between them and past the severing and the moistening means, for delivery in moistened condition at the front end of the machine.

The upper feed and measuring roll 21 is mounted on a combined roll carrier and tape guide, herein formed as a unitary casting, Figs. 2, 3 and 5 to 8. It comprises a pair of laterally spaced rearwardly projecting ears 22, 22 holding a pin 23 on which the upper roll 21 is freely rotatable. This carrier and tape guide unit further includes an upright portion 24 and a bottom foot or plate 25 projecting laterally beyond the ears 22 and having a smooth flat underface to serve as a top guide for the tape immediately forward of the feed rolls. The upper roll 21 is of a size and so located on the carrier as to project below the guide foot 25. Thus with the roll in its operative position against the lower feed roll 20, or in contact with the tape between them, the guide foot 25 is properly spaced vertically to define with the forward portion of the flooring 8 a chute or guide for the tape advanced forwardly beyond the feed rolls.

The upper roll carrier further comprises a transverse bearing 26 above the ears 22 and an upright portion 24, for reception loosely on a cross shaft 27, Figs. 5 to 7, said cross shaft serving as a horizontal pivotal support for the upper roll carrier as a whole and also as a cross connection between the side frames 1 and 2. For this purpose the frames have at transversely opposite upper portions upright brackets 1x, 2x, Figs. 25, 26, apertured for screws 27a, 27b tapped into the respective ends of the cross shaft 27.

This cross shaft also supports spring means for pressing the upper feed roll 21 against the tape and keeping it in feeding and measuring relation to the lower roll or wheel 20. Such spring means herein comprises a pair of duplicate coil springs 28, 28 set on the shaft 27 at opposite sides of the roll carrier, between the latter and the side frame brackets 1x, 2x, see particularly Figs. 2, 3 and 5 to 7. These springs have rear legs 28a, 28a hooked over the respective ends of the roll pin 23; and forward legs 28b, 28b tensioned across the upper edge of a cross member 115 the bottom edge of which provides the fixed cutter element of the tape severing means, to be described. For lifting the upper roll 21, and with it the top guide plate 25, to expose the tape path for inspection and cleaning purposes, the roll carrier has an upwardly and rearwardly projecting lifting lever 29 formed integrally with the roll carrier unit and presented for convenient engagement by the operator's fingers, on opening the housing cover 4.

Novel means, of extremely compact construction and arrangement, is provided for actuating the feeding and measuring mechanism, in association with the moistening and severing means. Referring to Figs. 2, 4 to 8 and 19, the lower feed roll or wheel 20 is mounted to rotate, in the forward or feeding direction, counter-clockwise in Figs. 2 and 19, on a stationary main shaft 30. At the left of the machine said shaft is held in a recessed boss 31 on the side frame 1, see particularly Figs. 8 and 25, while its opposite end projects freely through a bearing aperture 32 in the frame 2 and laterally out through an opening 53 in the side cover plate 3; see also Figs. 24 and 26. The feed wheel 20 has at its left face, Fig. 8, an elongated hub 20a loosely received on the shaft 30, the hub together with a washer 33 spacing the wheel relative to the frame 1 so as to present it centrally of the tape path.

At its other face the feed wheel 20 carries a pawl 35 pivoted on a stud 36, as best seen in Figs. 2, 8 and 19. A flat spring 37 having one end bent to engage around a button 38 on the wheel 20 presses the pawl toward the wheel axis. A similar button 39 depresses the spring at an intermediate point, to tension it. If desired, a shifting pawl such as that of Gautier Patent 2,290,041 may here be employed.

The pawl 35 coacts with a ratchet disk 40 so that the wheel 20 receives rotation in the forward, feeding direction (counter-clockwise in Figs. 2 and 19) but is left at rest during reverse return rotation, clockwise, of the ratchet disk and associated gearing. This ratchet disk 40 is mounted to turn on the cross shaft 30, which also carries the further train of operating parts to be referred to, all rotatable on it.

At the right side of the ratchet disk 40 and separably connected to turn with it is a coupler 41 having connector lugs 42 at its inner end for reception in corresponding recesses 43 in the ratchet disk. At its other end the coupler 41 has similar connector lugs 44 fitting in recesses 45 in the hub of a pinion 46. This pinion, the coupler 41 and the ratchet disk 40 accordingly rotate as a unit. The coupler 41 and the pinion 46 have a joint extent along the shaft 30 so as to fit snugly between the feed wheel 20 and the right side frame 2, all the described parts on the shaft 30 consequently being correctly located and held laterally by and between the two side frames.

Figure 4:
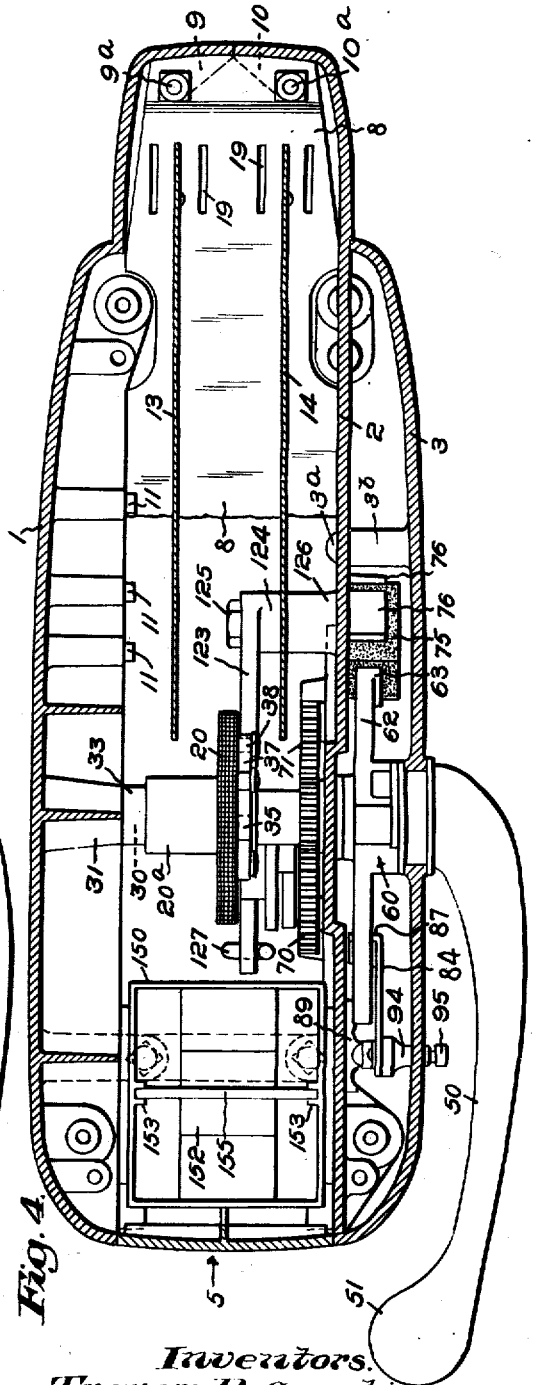
Fig. 4 is a horizontal section as on the line 4—4 of Fig. 2.

The feeding and measuring means, as well as the cut-off mechanism, to be described, are operated by the hand lever 50 disposed conveniently to the operator's hand and having a finger-engaging piece 51 at its fore end resembling a button or push-key; Figs. 3 and 4. This hand lever, herein at the right side of the machine, is the only exposed moving part, as evident in Figs. 1, 28 and 29. For assembly purposes it is associated with the side cover plate 3, so as to remain with the latter during removal and replacement of the plate.

Accordingly the hand lever 50 has at is lower end a lateral hub 52 adapted to extend through a corresponding aperture 53 of a boss 53a on the side plate 3, see also Fig. 24, said plate aperture having horizontal radial recesses or slots 53b. The lever hub 53 has at its inner end a pair of inwardly and also radially projecting lugs 54, 54, best seen in Figs. 19 and 20. At the outer face of the side plate, between it and the lower end of the lever, is a thrust washer 55 centrally apertured at 56 for reception on the lever hub 53 and having radial recesses 57, 57 for passage of the lever hub lugs 54 in assembling the washer. After this washer 55 is passed onto the lever hub the washer is given a quarter turn, bringing its radial recesses 57 out of line with the lever hub lugs 54, and into line with a pair of shallow lugs 54a at the inner face of the lever; see Fig. 20. These enter the washer recesses 57 and hold it against turning relative to the lever. The lever hub is then inserted through the apertured boss 53a of the cover plate 3, the hub being positioned with its lugs 54 horizontal, in line with the radial recesses 53b of the cover plate. A second washer and lock ring 58, with similar central aperture 58a and radial recesses 58b is then passed onto the lever hub, at the inner face of the cover plate and given a quarter turn to carry its recesses out of line with the lever hub lugs 54. This brings a non-recessed portion of the lock washer 58 behind the lever hub lugs, between them and the cover plate. Thus the lever is demountably locked in assembled position on the plate, yet left free to swing in the vertical plane relative to it.

In some instances, particularly where, as here shown, the radial lugs 54 of the hand lever 50 are out of line with the cover-plate slots 53b in all operative positions of the hand lever when the cover plate is in place, either or both of the outer and the inner washers 55 and 58 may be dispensed with. In such case the hub of the hand lever may have a slot-covering flange corresponding to the outer washer 55 formed integrally with it, while its lugs 54 may be appropriately extended axially by substantially the thickness of the inner washer 58.

In addition to the feed elements described, the shaft 30 also provides bearing support for the hand lever 50 and for the operating crank 60 which transmits motion from the hand lever to the other actuating parts. This crank 60, of a general bell-crank form, has fixed on it a laterally extended bearing sleeve 61 rotatably received on the projecting end of the shaft 30. The hand lever hub 52 is centrally recessed to receive this crank bearing sleeve 61 and the enclosed end of the shaft 30, so that the sleeve and shaft afford the bearing support for the hand lever, rather than the side plate 3. The side plate 3 itself is demountably secured to the side frame 2 by a number of screws 3a extending out through the latter into bosses 3b at the inner face of the cover plate 3; see Figs. 4, 9, 10, 12 and particularly Fig. 24.

The crank or main actuating element 60 is directly associated with the hand lever 50 and is seen separately in Fig. 19. It comprises a rear arm 62 having a stop foot 63 at its outer end, an intermediate depending arm 64, and a forwardly extended length-control arm 65.

The body of the crank 60 adjacent its sleeve bearing has a pair of radial recesses 66, 66 which receive the lugs 64, 64 on the hand lever 50. Thus in the assembled position of the parts the hand lever is directly connected to the crank in fixed angular relation to it.

The central arm 64 of the crank 60 has at its lower end a lateral boss 67 which extends in through and is longitudinally movable in an opening 68 in the adjacent side frame 2; see Figs. 8 to 10, 13, 14 and 26. The crank boss 67 is apertured as at 67a, Fig. 19, to support a stud 69 having at its inner end a bearing 69a for rotatably mounting a traveler gear 70, desirably of a light weight but resistant material such as fiberoid or other composition.

As the crank 60 is rocked about the shaft 30 as an axis, by vertical movement of the hand lever 50, the traveler gear 70, being carried on the crank by the stud 69, is swung bodily lengthwise the machine and along an arc about the crank axis. Vertically below the gear 70 is an arcuate toothed rack 71 integrally cast or otherwise fixed at the inner face of the frame 2 as by rivets 72 received in bosses 73 thereon; see Figs. 2, 7, 15 to 19 and 26. This toothed rack 71 is shaped and positioned to be concentric with the crank axis, namely, the shaft 30, so as to have meshing engagement with the gear 70 throughout its bodily reciprocating movement lengthwise the machine. This gear 70 also is proportioned to mesh constantly with the previously mentioned pinion 46 on shaft 30. Accordingly, as the gear 70 is bodily traveled lengthwise the stationary rack 71 by movement of the hand lever 50, it is also forced to rotate on its own axis, and in so doing also to rotate the pinion 46 and with it the feed wheel 20.

This drive gearing has a high ratio, such that a small angular movement of the hand lever 50 affords a substantially increased rotation of the feed wheel 20. In the illustrated example, the hand lever has a maximum stroke of only about 45°. But in making such relatively short stroke it may impart several full rotations to the driven feed wheel 20. Accordingly the length of tape obtainable by a single stroke of the hand lever has a correspondingly wide range, as calculated for the given size of machine and the particular field of use. Merely by way of example, with a feed wheel 20 of but about a two-inch diameter the described construction and arrangement of hand lever and gearing connections gives accurately measured tape lengths from about 2 inches up to 6 and 8 inches or more.

In association with the feeding and measuring mechanism, means is herein provided for readily setting the machine to dispense various predetermined tape lengths, within the maximum range as selected by the operator. For the majority of small packaging jobs, as at retail store counters, a selection as between four lengths, say 3, 4, 6 and 8 inches, is found adequate. Accordingly, while a greater or less number of length settings may be employed, the present feed-length-control means provides for selective delivery of four different lengths, as above specified by way of example. This length setting may be quickly shifted from one length to another, even between rapidly successive operations.

When at rest the hand lever 50 stands in the up position substantially as in Figs. 1, 7, 13, 28 and 29, to which it is automatically returned on release after a feed stroke. This normal rest or up position is determined by a return stop 75, Figs. 6, 13 and 14, comprising a block of rubber or other resilient material inserted between rear and side positioning fingers 76 on the side frame 2 and cooperating lugs 77 on the cover plate 3; see Fig. 24. The upper forward end of this block lies in the path of the foot 63 on the rear arm 62 of the lever-operated crank 60, previously described. Other return stop means, which may be used in conjunction with the buffer 75 or as an alternative for it, will be referred to later.

Downward movement of the hand lever 50 from its up position through any given arc up to its full available stroke effects the measuring and feeding of a proportionate length of tape. As mentioned, means for selecting certain definite lengths is provided, herein by selectively limiting the down or forward motion of the hand lever.

For this purpose, noting particularly Figs. 13, 14 and 19, the forward or length-control arm 65 of the crank has a series of shoulders or stops 80, 81, 82 and 83, each with an abutment face disposed substantially radially of the crank and hand lever axis 30. These stops are cooperable with a feed-length selector comprising a dog 84 having a lateral boss 85 at its upper end pivotally received in a bearing collar 86 on the side frame 2; Figs. 11 and 26. At a lower portion this selector 84 has a lateral stop finger 87 disposed relative to the path of the crank arm 65 so as to bring it selectively into opposition to any one of the stop shoulders 80 to 83. A spring detent 88 depending from the selector dog 84 yieldably engages a segment 89 near the base of said side frame 2, so as to be held releasably in any one of a series of notches 90, 91, 92, 93 corresponding to the several stop shoulders 80 to 83 respectively.

For setting the selector 84 it has a pin 94 which extends out through a short arcuate slot 95a in the side plate 3 and terminates in a setting button 95. The side plate may be marked with a scale or appropriate figures, such as 3, 4, 6, 8 cast or otherwise formed, to indicate the button positions to afford the corresponding lengths of tape; see particularly Fig. 1. As evident from Figs. 1, 13 and 14, the right or rearmost setting of the button 95, wherein the spring detent 88 occupies the rearmost notch 90, gives the shortest feed selection, in this instance 3 inches, since the stop 87 on the selector 84 is then presented in the path of the rearmost shoulder 80 of the crank arm 65. Similarly, by placing the setting button 95 opposite the next to rear or 4-inch indication, the spring detent 88 is seated in the next-to-rear notch 91 and the selector stop 87 is brought into the path of the next-to-rear stop shoulder 81. The selector operation for the other settings is similar.

Figs. 13 and 14 respectively illustrate the length-control parts in their positions as prior to a feed stroke of the hand lever, and at the end of the feed stroke, just before release of the lever. The particular length setting as there selected is that for a 6-inch tape delivery. Accordingly the spring detent 88 is in notch 92, the third from the rear. As seen in Fig. 14 the stop 87 of the selector dog 84 then effectively opposes the stop shoulder 82 of the crank arm 65, the third from the rear in the series. In this setting the stop shoulders 80 and 81, for the shorter tape lengths, pass freely above the variable selector stop 87.

Novel mechanism is herein provided for returning the hand lever 50 to its normal or rest position of Figs. 1, 5, 6 and 13. By this mechanism adequate return force is accorded the lever for all lengths of feed stroke, including extremely short strokes as well as those of maximum length. But under a compensating action the return force is made more nearly uniform for the different extents of forward or feeding motion of the hand lever.

Such mechanism herein comprises a first or main spring 100 of the retraction type, best seen in Figs. 13, 14, also Fig. 5. It is attached at its lower end to a pin 101 on the length-control arm 65 of the operating crank 60, and at its upper end to a pin 102 at the outer face of the side frame 2. The tensioning of this spring 100 increases with the downward stroke of the hand lever 50, the greater the feed stroke length, the greater the spring tensioning.

In cooperative relation to this main spring 100 is a second or compensator spring 103 of the expansion type. It is so disposed that at times it work with and supplements the action of the main spring 100 while at other times, and particularly in connection with the longer feed strokes, it opposes and tends to neutralize the action of the main spring.

The compensator spring 103 surrounds a plunger 104 having at its upper end a collar 105, see Figs. 5 and 8 to 10, pivotally received on a projecting portion of the stud 69 on the intermediate arm 64 of the crank 60, which stud as previously mentioned provides the bearing for the traveling gear 70. A nut 106 holds the plunger collar on said stud, and the latter in assembled position on the crank 60. The plunger 104 carries a washer 107 against which the upper end of the spring 103 bears. The lower portion of the plunger is slidably received in a sleeve 108 having a reduced lower portion 109 removably seated in a corresponding aperture in a bracket 110 swiveled on a stud 111 on the adjacent side frame 2.

In Fig. 13, with the hand lever 50 in rest position, the compensator spring 103 is substantially free of compression. By reference to Fig. 14, it will be seen that in the course of a down stroke of the feed lever and accompanying swinging of the crank 60 in the counter-clockwise direction the auxiliary spring 103 is tensioned compressively up to an intermediate position of the parts somewhat short of that represented in said figure. As there shown the feed lever 50 has completed an approximate three-quarter maximum stroke such as for the 6-inch feed length setting described. On Fig. 14 a center line L—L is indicated, through the feed lever axis 30 and the spring bracket stud 111. With reference to said center line, the supporting stud 69 of the spring-positioning plunger 104 has in effect crossed center, passing to the right of said line. Accordingly, the spring 103 has passed its maximum compression and has been partially relieved. Hence during the first part of the lever return, the compensator spring must be compressed, in opposition to the retractive tendency of the main spring 100. It will be evident that this compensatory action is correspondingly increased for any greater feed stroke and return action of the hand lever 50 beyond that illustrated in Figs. 13, 14.

Thus, under a condition such as that of Fig. 14, upon release of the hand lever 50, the initial effect relative to the compensating spring 103 is to compress it, up to the point at which the plunger stud 69 recrosses said center line L—L of Fig. 14. This compressive action on the compensator spring 103 is in direct opposition to the maximum retractive effect of the then extended main spring 100 and hence neutralizes the latter to a corresponding extent. During the lever return stroke the compensating spring 103 exerts its expansive effort until the return of the parts pass said line L—L. By properly proportioning the springs 100 and 103 relative to each other a substantial uniformity of return action for the hand lever and associated operating parts may be had. Generally with a construction and arrangement as illustrated, the compensating spring 103 is considerably lighter than the main spring 100.

Turning now to the severing of the measured lengths of moistened tape, the mechanism for this purpose is operatively associated with the described feeding, guiding and measuring means, and is actuated automatically through the medium of the hand lever 50.

The cutter element comprises a fixed blade 115 transversely positioned on the frames 1 and 2 with its lower edge just above the tape path, in shearing relation to the movable blade 116. At its left end, Fig. 5, the fixed member 115 has a reduced portion 115a received in a seat 115b, Fig. 25, on the frame 1, while its other end projects laterally through an opening 117 in frame 2, Figs. 13, 14 and 26, and is supported by a bracket 118 removably held on the frame 2 as by screws 118a. The projecting right end of this fixed blade 115 has a depending portion which is apertured for a stud 119 extending through the adjacent end of the movable blade 116 and through the lateral arm 118b of the bracket 118, said stud providing the pivot for the movable blade 116 and the means for connecting the right end of the associated fixed blade 115 to said bracket.

The movable blade 116 normally occupies a position clear of and herein below the path of the tape, Figs. 5 and 6; see also Figs. 15 and 16. In cutting the tape it is raised to a position substantially as in Figs. 17 and 18, making a rapid up cutting stroke with immediate return. This is effected by a trip mechanism and operating connections associated with the hand lever 50 through the medium of the crank 60 already described.

Referring to Figs. 5, 7 and 8, also to Figs. 15 to 18, the pivot stud 69 for the traveling gear 70 and which is mounted in the aperture 68 of the intermediate depending arm 64 of the crank 60, projects in beyond said gear 70 and supports in fixed angular relation to it a depending finger 120 having at its lower end a trip element including a pin 121 rotatably carrying a cam roll 122. This cam roll finger 120 and its supporting stud 69 have a limited angular movement or lost-motion effect relative to the crank 60, as provided by a squared portion 69b received in a like recess 67a at the inner face of the boss 67 on the crank arm 64. Said recess 67a has a slightly greater angular extent relative to the axis of the stud 69 than the squared portion 69b of the latter, affording the lost motion referred to and facilitating the tripping action for the cutter.

The cutter actuating means further comprises a trip lever 123 extending horizontally at a lower inner portion of the side frame 2, herein adjacent the rack 71 for the swinging gear 70; see Figs. 4, 7 to 10, 15 to 18 and 26. This trip lever 123 has a bearing collar 124 at its rear end whereby it is mounted to rock vertically on a stud 125 projecting from a boss 126 on the side frame 2. At its front end this trip lever 123 is positively connected to the movable blade 116 as by a rigid link 127 having lower and upper hook-like pivotal connectors 128, 129 projecting at different angles, so as respectively to extend crosswise and lengthwise of the machine. The lower connector 128 is pivotally received in an aperture at the fore end of the trip lever 123, while the upper connector 129 is similarly attached to an intermediate portion of the movable blade 116. The link 127 accordingly connects the trip lever 123 and the swinging blade 116 for up and down movement together. During such movement the link moves pivotally both laterally and also longitudinally of the machine, as permitted by the pivotal connections at its opposite end; compare Figs. 15 and 16 respectively with Figs. 17 and 18.

The pivoted blade is operated through the described link connections with the trip lever 123, the latter in turn actuated in response to a feeding and return movement of the hand lever 50.

Noting Figs. 7 and 13 to 18, the cam roll finger 120 swings rearwardly during a forward and downward feed stroke of the hand lever 50, and is returned forwardly with the hand lever return. The described trip lever 123 is actuated by said finger 120 in conjunction with the hand lever return.

For this purpose the trip lever 123 carries a trip member or dog 130 pivotally hung on it between its ends, as at 131; Figs. 7, 16 and 18. This dog has front and rear arms 132 and 133 respectively overlying stops 134 and 135 on the trip lever for limiting its vertical rocking movement. At its under portion this dog has oppositely inclined cam faces 136 and 137, the rear one of which presents an abrupt shoulder as at 137a, for cooperation with the cam roll 122 of the trip finger 120.

In the normal or rest position of the parts, in which the hand lever 50 is elevated, as in Figs. 1 and 13, noting also particularly Fig. 7, the cam roll 122 stands in front of the forward cam surface 136 of the pivoted dog 130. As the hand lever 50 is depressed for a feed stroke, the cam or trip finger 120 through the medium of the crank 60 is swung rearwardly, toward the left in Fig. 7. During this movement the pivoted dog 130 is lifted idly, to an extent limited by the front stop 134 on the trip lever 123, the cam roll 122 passing under the lowest portion of the dog so as to be brought behind its rear cam surface 137.

As the feed stroke of the hand lever continues, the finger 120 and its cam roll 122 move on back away from the dog 130, the latter tipping back to its initial position as defined by down engagement of its rear arm 133 with the corresponding stop 135 on the trip lever 123. This down movement of the dog takes place by gravity, since the portion of the dog behind its pivot 131 is the heavier. In the illustrated construction it is accelerated and made certain by the knife and trip-lever return spring 140, which has its lower end connected to the front arm 132 of the dog as by a pin 132a thereon and its upper end connected as at 141 to a portion of the movable blade 116 remote from the pivot of the latter, in a manner to be referred to later.

The extent of movement of the trip finger 120 rearwardly past the dog as just referred to depends on the degree of depression of the hand lever 50, in accordance with the selected tape length to be measured out. But regardless of the length of tape delivered within the available range, the construction and arrangement of the parts herein is such as to insure that the trip finger is thus preparatorily carried to the rear of the dog during an early part of the given feed stroke, including the shortest. The position of the described parts as at or near the end of one of the longer feed strokes is represented in Fig. 16, a skeletonized view looking from the right side of the machine, similarly as in Fig. 2, the rear of the machine in this instance being at the right.

On release of the hand lever 50 at completion of a down or feed stroke, its described return means causes the trip finger 120 to return forwardly, toward the left in Fig. 16 (toward the right on Fig. 7). In the course of this return movement, when the tape feed has been completed and the tape accordingly is at rest, the cam roll 122 engages the rear inclined face 137 of the dog 130, strikes the abrupt shoulder 137a of the latter, and thrusts the trip lever 123 sharply and rapidly upward. The trip finger 120 and its cam roll 123 continue their forward return during a remainder of the hand lever return movement, the cam roll passing forwardly beneath the lowest portion of the dog so as to bring the latter again to its initial or rest position of Fig. 7 in front of the dog 130 and immediately below its forward inclined face 136. The position of the parts during such trip-lever elevating action, with the cam roll 122 just on the point of passing forwardly under the lowest portion of the dog 130, is illustrated in Fig. 18, a view corresponding to Fig. 16.

Through the described pivotal link connection 127 between the trip lever 123 and the movable blade 116 it will be seen that the quick positive upthrow of the trip lever 123 affords an extremely rapid shearing action for the blade, with substantially instantaneous release and return thereof to its normal position clear of and herein below the tape path, in immediate readiness for severing a succeeding length of tape. The lost motion connection between the trip finger 120 and the operating crank 60, by reason of the radial rib and slot structure previously described, facilitates the movement of the cam roll 122 past the pivoted dog 130, particularly with the latter in either of its extreme positions, such for example as in Fig. 18. Likewise the lost motion between the hand lever 50 and the driven feed wheel 20, as may be provided for by appropriate clearance between the hand lever lugs 54 and the recesses 66 on the crank 60, Fig. 19, or by the use of a shifting pawl such as that of Patent No. 2,290,041, previously referred to, or both, avoids interference with the cutting action due to occasional rebound of the hand lever.

The movable blade 116 and the trip lever 123 are together returned to and normally held in their down position, as in Figs. 7, 15 and 16 (see also Figs. 5 and 6), by means of the coil spring 140 which interconnects them. From a consideration particularly of Figs. 15 to 18, it is evident that this spring 140 has a vertical bodily movement with the blade and the trip lever 123, during which it also is extended and further tensioned. In the down or rest positions of these parts, as in Figs. 15, 16, the spring normally stands under some tension, holding the blade and the trip lever as closely together as their interconnecting link 127 permits. Since such condition of relative approach of the blade and the trip lever can only be had with the blade open or down, as in Figs. 15 and 16, the spring normally pulls and holds the blade down, and through the link 127 likewise depresses the trip lever 123.

The lower end of the link 127 is more remote from the lever pivot 125 than the upper end of the link is from the blade pivot 119. Hence for a given angular up movement of the lever 123 the link accords a greater angular movement to the blade 116. At the same time the free end of the blade, including the attaching point 141 of the upper end of the spring 140, which is more remote from the blade pivot than the upper end of the link 127 is, receives a greater lineal up movement than does the lower end of the spring by its connection to the lever 123 through the dog 130.

Consequently the spring is extended and additionally tensioned during up movement of the blade and its trip lever 123. But as soon as the cam roll 122 has cleared the dog 130, just forwardly of the position shown in Fig. 18, the spring 140 is free to contract. To do so it must bring the blade and trip lever closer to each other, to the extent which the link 127 allows. The effect is to pull down the blade, and, through the link, to thrust down the trip lever, into the rest position of Figs. 7, 15 and 16. Down movement of the trip lever 123 as well as that of the blade, is halted in this position by a fixed stop, herein comprising a pad or cushion 142 on a bracket 143 projecting from the adjacent face of the frame 2; see also Fig. 5.

It will be seen also that the spring 140 has a rearward and downward inclination, its lower end being anchored somewhat to the rear of the pivoted blade 116. Thus it has a component force effective to bias the movable blade toward the fixed blade 115, affording them an efficient cooperative shearing action.

At an earlier point we have described means including the resilient back-stop or buffer 75 for halting the return motion of the hand lever and associated reciprocating parts of the feed action. In some instances, particularly where a rapid return stroke is desired, yet without attendant objectionable rebound or overfeed, such means may be supplemented by, or have substituted for it, means affording a braking or positive stopping action on and through a rotary member of the feed mechanism.

Herein for the purpose such arrangement is shown in connection with the intermediate or traveller gear 70. As seen in Fig. 7 and particularly in Figs. 16 and 18, said gear 70 has at its inner face, its face adjacent the cam-roll arm or finger 120, a laterally projecting stop member such as the pin or screw 70a. In the normal or rest position of the parts this stop 70a stands against the forward edge of said arm or finger 120, substantially as in Figs. 7 and 16. As the gear 70 travels bodily rearward along the rack 71 in the course of a feed stroke, the rotation of the gear carries the stop 70a away from said finger 120, to a position such for example as in Fig. 18, which shows the parts as at the end of a less-than-maximum feed stroke. On release and return of the hand lever 50 and with it the gear 70, the stop 70a returns rotatively to its initial or rest position of Figs. 7 and 16, bringing up positively against the forward edge of the finger 120. Further rotation of the gear 70 being thus positively blocked, the gear cannot move further forward along the rack and accordingly further rearward return motion of the hand lever 50 is positively stopped. The energy of the halted parts is taken up in part by the lost-motion mounting of the finger 120 previously referred to and by the interengaged gear and rack, substantially eliminating any tendency for the gear to turn reversely, in the feed direction.

Where such positive stop means as afforded by the stop 70a is employed in combination with a buffer element such as the resilient back-stop 75, these two elements are so relatively arranged that the buffer-engaging member, herein the foot 63 on the arm 62 of the lever-operated crank 60, will engage the buffer 75 substantially simultaneously with or a brief instant after the striking of the stop 70a against the finger 120. Thus the momentum of the parts in the return direction may largely be absorbed by the buffer but with little or no actual compression of the latter. The result is an extremely positive stopping action, substantially without rebound or tendency of overfeeding of the tape at the end of a lever return stroke. As above indicated, in some instances the buffer means such as 75 may be dispensed with. In such constructions, or under the provision of the joint stopping elements as herein illustrated, the stop pin or screw 70a may carry a fibre or other collar 70b for the direct contact with the engaged element such as the roll arm or finger 120.

As previously indicated, the tape from the supply roll T (Fig. 2) is advanced along the under-guide 8, by the engagement of the feeding and measuring rolls 20, 21 with its opposite faces, the tape passing below the guide foot 25 of the upper roll carrier and forwardly past the severing means and below the fixed blade 115. Beyond this cut-off point the leading portion of the tape is advanced to and past additional guides and correlated means for moistening its gummed (under) face.

Such means comprises a tank or reservoir 150, best seen in Figs. 2, 4, 7 and 11. Desirably it is formed of a plastic transparent or semi-transparent composition permitting the level of the contained moistening liquid to be observed. In this tank is removably set a capillary moistening element, such as the inverted brush 151 resting on its butt 151a. The bottom wall of the tank is projected up, centrally, in an inverted V-formation 152 transverse of the tank. The oppositely inclined walls of this raised formation serve to direct the butt of the brush 151 into correct position in the tank, substantially as in Fig. 7, when the brush is merely dropped into it. The side walls of the tank have central vertical ribs 153 at their inner faces, each with a slot 154 at its upper end to support a removable partition 155, of similar material as the tank or otherwise. The brush 151 is adapted to incline forwardly against this partition, with the free ends of its hair or bristles projecting above the tank. By reason of the removable partition or upper support for the brush all the interior of the tank is readily accessible for cleaning. As thus constructed the tank is reversible end to end, so that the brush may be located in either half section of tank and the latter inserted into the machine, with the then brush-carrying section to the rear. This automatically positions the upper end of the brush in correct moistening relation to the under face of the tape.

Referring to Figs. 2, 7 and 11, the tank assembly as a whole is removably positioned between the forward portions of the side frames 1 and 2, upon a pair of opposed horizontal ribs 156, 157 on the latter. Inward movement of the tank is limited by one or more lateral projections as at 158, Fig. 2, and it is held against forward displacement by lugs 159, 160 on the respective side frames and having vertical rear faces to abut the lower front wall of the tank. These lugs may also serve as positioning stops for the front closure element 5, together with the outer ends of upper and lower horizontal ribs 181, 182 and 183, 184, Figs. 11, 25 and 26, on the respective side frames. These latter ribs also guide and locate the tank laterally; Fig. 11.

In the closed position of the front closure 5, the tank 150 is held down by a hook-like projection 165 at the inner face of said closure 5, adapted to overlie the top edge of the tank front wall, as best seen in Fig. 7; see also Fig. 27. The tank unit may readily be lifted out from the machine on swinging the front closure 5 to its open position shown in Fig. 7. This front member also affords a convenient location for the name plate 166 held on a rectangular frame 167, Figs. 7 and 27, at the inner face of the closure. Such plate 166 itself serves as a further front positioning means for the tank 150.

As mentioned earlier, this front closure 5 also provides a delivery table or guide for the moistened lengths of tape dispensed by the machine. For this purpose its main wall is in-turned at its upper end and is projected rearwardly and somewhat downwardly to form a delivery guide 170. Thus in the normal closed position of this front member 5, as shown dotted in Fig. 7, the rear edge of its tape guide portion 170 stands directly in front of or contacts and assists to support the projecting end of the brush moistener 151. At the sides of the tape path this guide formation 170 of the front closure 5 further includes integral upstanding projections 171, 172 for confining the tape laterally; see also Figs. 3 and 28. The top edges of these lateral guides 171, 172 are disposed along a similar line of upward and rearward curvature as the adjacent portions of the side frames 1 and 2 and of the side cover plate 3, affording a complete and conforming closure for the front of the machine as a whole, the top cover 4 fitting snugly down onto the top side portions of front element 5.

As best seen in Fig. 3, also Figs. 27 and 28, the guide means 170, 171, 172 on the front closure 5 present an open-top trough-like formation the floor of which terminates forwardly in a downwardly rounding portion as at 173 merging into the main vertical wall of this front element. This formation facilitates the delivery and seizure of the moistened, severed lengths of tape as measured out by the machine.

The combined closure and delivery element 5 is pivotally supported by means of a pair of inwardly extending ears 168 at its lower portion, these being apertured in transverse alignment for bearing reception on pivot lugs 169 at the bottom front corners of the frames 1 and 2; Figs. 25-27. This front door-like element is automatically returned to and normally held in its closing position, herein by means of a coil spring 175 having its forward end hooked in an eye 176 integrally formed at the inner face of the closure. The rear end of this front cover spring 175 is engaged in an aperture in a cross bar 177 extending between and bolted to opposed lugs 178, 179 on the respective side frames 1 and 2. This cross bar 177 also serves as a further transverse brace and interconnection for the front portions of the side frames.

Beyond the severing means the advancing tape is directed into contact with the moistener by a guide and presser unit, seen in Figs. 2, 3, 7 and 11 and separately in Figs. 21 to 23. This comprises a bottom plate or floor member 180 extending substantially across between the side frames and longitudinally from a position closely adjacent the movable blade 116 out into close proximity with the upper end of the brush 151. The rear edge of this bottom guide 180 is downwardly inclined as a lip 181 to receive and direct the leading edge of the tape with certainty onto it. Opposite lateral portions of this lip 181 are extended to form supporting collars 182, 183 for pivotal reception on opposed bearing bosses 184, 185 cast on the side frames 1 and 2 and which provide horizontal pivotal support for the guide and depresser unit as a whole. The rear lip 181 on the plate 180 also has a downwardly projecting finger 186 adapted to bear against the front face of the blade 116 at times when the brush and tank have been removed, and thus to keep the guide-depresser unit from dropping down into the space normally occupied by the tank. Hence when the tank is to be reinserted the operator need give no special attention to lifting this guide-depresser unit.

Along its lateral edges the bottom plate 180 has upturned flanges 187, 188 which project forwardly beyond the front edge of the plate and there provide bearing support for the end pintles 189 of a tape presser or depressing element in the form of a circumferentially grooved roll 190 adapted to rest on the top face of the tape opposite the brush, or directly on the brush in the absence of tape between it and the roll.

The roll pintles 189 also provide pivotal support for the top guide plate 191 which cooperates with the bottom plate 180 to present an enclosing chute for the tape. This top plate 191 has upright and forwardly projecting flanges 192, 193 received between the flanges 187, 188 of the bottom plate, both pairs of flanges being apertured in line with the roll axis so as to receive its bearing pintles 189.

These chute-forming guides 180 and 191 have their forward transverse edges substantially in vertical line, closely behind the brush and the presser roll 190, and in such relation to the latter that the tape is directed along a tangent to the under portion of the roll where it seats on the brush. The top plate 191 extends rearwardly over the under plate 180 and has its rear edge 194 deflected upwardly to form with the downturned lip 181 of the under plate a directive mouth for the tape immediately in front of the cut-off blades. This mouth or entrance to the guide chute 180, 191 is of considerable vertical extent at its receiving end adjacent the blades, so as to insure entrance of the leading edge of the tape into the guide chute despite any possible variations in the vertical level of the tape as it is advanced across the fixed blade 115.

Correct vertical spacing of the guide plates 180 and 191 is maintained at their forward portions by reason of their pivotal interconnection at the pintles 189 of the presser roll 190. At their rear portions such spacing is determined by down projections or stops 195, 196 at the respective sides of the underface of the top plate 180. These desirably are of a rounded form as seen in Fig. 21 to facilitate the lateral guiding and centering of the tape, particularly that of maximum width for the given machine.

For manipulating the upper guide plate 191 and also the described presser-guide unit as a whole, said plate has secured at its upper face an upright finger piece 197, which also constitutes a weighting element for this entire unit. By grasping this finger piece or button 197, which desirably is a relatively heavy solid metal element, the operator may easily swing the top guide 191 forwardly on its own pivotal support at the presser roll axis and into a position as shown dotted in Fig. 23. This exposes the whole interior of the guide chute between the severing means and the moistener. If then it is further desired to inspect the brush and tank, without necessarily removing them, the entire unit may be lifted and swung rearwardly about the axis provided by the frame lugs 184, 185 on which the under plate 180 is pivoted by its collars 182, 183. This latter axis is the same as that about which the presser-guide unit as a whole has a yielding vertical movement for accommodation of the presser roll 190 to the position of the upper end of the moistening brush, it being noted in this connection that the entire feed chute assembly 180—191 pivots vertically on said fixed axis, which is located at the rear of the unit as a whole and at a point substantially spaced behind the brush and its cooperant presser roll 190.

Thus the roll is capable of a substantial range of vertical adjustment yet the tape is always insured of positive guiding along substantially a straight line from the severing blades up to and between the contact areas of the roll and brush and thence onto the delivery platform 170 of the front closure 5. In all operative positions of this unit its top and bottom guides 180, 191 including their rear mouth have the same fixed relation to the presser roll 190 so as to direct the tape along the same tangential line to the under brush-contacting area of the roll.

From the disclosure herein it will be evident that the invention includes as an important aspect an improved structure and organization for a moistened tape dispensing machine in its entirety, with improved cooperative interrelation of its integrated mechanisms for measuring out and advancing lengths of the tape, for guiding, moistening and delivering them, and for cutting off the measured moistened lengths. In this connection it is noted by way of example that the front closure element 5 partakes directly in the functions of guiding, feeding, moistening and cut-length delivering; and that the fore chute and presser moistener roll assembly, itself importantly functioning in the feeding, guiding and moistening actions, also is novelly correlated with the severing means. The invention further comprises sub-combinationally the numerous features of novelty presented by the mechanisms individually.

Claims pertinent to certain features of the invention not claimed herein are otherwise claimed as for example in our divisional application Serial No. 526,582.

Our invention is not limited to the particular embodiment as herein illustrated or described, its scope being set out in the following claims.

We claim:

1. In a tape dispenser, a frame, a shaft thereon, a feed roll and drive mechanism therefor supported on the shaft, said mechanism including pawl and ratchet elements, one fast with the feed roll and the other rotatable separately therefrom in one direction, a toothed pinion, a coupler between the pinion and said other of the pawl and ratchet elements, a crank having a bearing formation, and an operating lever having a supporting hub and interengaging lug and groove formations connecting the crank and lever hub for movement in unison, said parts adapted for removable assembly on said shaft.

2. In a tape dispenser, a frame providing support for a tape supply, rotary measuring and feeding members for the tape, an operating lever mounted to swing on a horizontal axis, an arm disposed radially of the lever axis and moving with the lever, a gear rotatably carried on said arm, an arcuate rack fixed on the frame in concentric relation to the lever axis and in meshing engagement with said gear, and one-way drive connections between the gear and the rotary members, whereby swinging of the operating lever in one direction rotates the gear and from it imparts movement to the rotary members.

3. In a tape dispenser, a frame, a shaft thereon, a feed roll and drive mechanism therefor supported on the shaft, said mechanism including a crank having an arm portion carrying a gear rotatable on an axis paralleling the shaft, a pinion on the shaft meshing with said gear, and an arcuate rack fixed on the frame concentrically of the shaft.

4. In a tape dispenser, a frame, a shaft thereon, a feed roll and drive mechanism therefor supported on the shaft, said mechanism including an arcuate rack fast on the frame in concentric relation to the shaft, a crank on the shaft and rotatably carrying a gear on an axis paralleling the shaft, a pinion on the shaft in driven engagement with the gear, said crank having an arm formed with a plurality of shoulders spaced angularly with respect to the shaft, and adjustable stop means engageable with said shoulders selectively, to limit correspondingly the movement of the feed roll in the feeding direction.

5. In a tape dispenser, a frame, a shaft thereon, a feed roll and drive mechanism therefor supported on the shaft, said mechanism including an arcuate rack fast on the frame in concentric relation to the shaft, a crank on the shaft and rotatably carrying a gear on an axis paralleling the shaft, a pinion on the shaft in driven engagement with the gear, movement of the crank in one direction serving to rotate the feed roll to advance the tape, a substantially radial arm angularly fixed relative to the crank, and stop means on the frame for engagement by said arm to halt opposite return movement of the crank.

6. In a machine for dispensing gummed tape in measured moistened lengths, a support for a tape supply, rotary members to advance the tape from the supply, a pivoted hand lever, one-way drive connections between the hand lever and the rotary members, said lever having a variable-length feed stroke and an opposite return stroke, a main return spring for the hand lever, said main spring arranged to be increasingly tensioned through the total length range of the hand lever feed stroke, and auxiliary spring means coacting with the lever and main spring to supplement the latter in response to relatively short feed strokes and partially to counteract the main spring following longer feed strokes.

7. In a machine for dispensing gummed tape in measured moistened lengths, a support for a tape supply, rotary members to feed the tape from the supply, a pivoted hand lever, one-way drive connections between the rotary members and the hand lever affording the latter a feed movement and an opposite return movement, a main return spring for the hand lever, and compensating auxiliary return means comprising a radial arm moving with the lever, a spring-guiding plunger having one end pivoted to said arm, a guide slidably receiving the other end portion of the plunger, said guide mounted to turn about a fixed pivot paralleling that of the hand lever, and a coil spring on the plunger between its pivoted end and the plunger guide, said arm and plunger having a toggle-like action wherein the plunger spring is loaded during part of the hand lever movement in the feed direction and is relaxed during a subsequent part of said movement by amounts proportionate to the length of such subsequent feed movement.

8. In a tape dispenser, a frame providing support for a tape supply, rotary measuring and feeding members for the tape, an operating lever mounted to swing about an axis on the frame, one-way drive connections between the lever and the rotary members, a crank coaxial and moving with the operating lever, said crank having a plurality of shoulders serially disposed about the lever axis, a feed-length selector movably supported on the frame and carrying stop means for presentation selectively in the path of one or another of the crank shoulders, according to the positioning of the selector, and means for setting the selector for engagement of its stop means with a selected crank shoulder thereby to determine the tape length to be measured and fed by the rotary members.

9. A tape dispenser according to claim 8 wherein a complete housing enclosure incorporates the frame, said enclosure including a removable side cover plate, the operating lever being disposed at the outer face of the cover plate, the latter having a slot through which the length-selector setting means extends into ready availability to the operator.

10. In a tape dispenser, in combination, a frame presenting a tape supply support and an underguide for the tape, cooperative fixed and movable cutter blades transverse of the tape path, an under feed roll engageable with the under face of the tape behind the cutter blades, and a combined upper feed roll and tape guide assembly unit on the frame above the under roll, said unit comprising a carrier mounted for vertical rocking movement and including a body, a forked rear portion, an upper feed roll rotatable on the rear portion, a guide plate at the base of the carrier body, and spring means yieldably urging the carrier into operative interengagement of the upper and under feed rolls, the upper feed roll and the carrier guide plate being constructed and arranged so that said interengagement of the rolls automatically presents the guide plate in tape guiding relation with the under guide along substantially the extent of the tape path between the feed rolls and the cutter blades.

11. An upper feed roll and guide carrier for tape dispensers, comprising a body, a transverse shaft-receiving bearing formation at an upper portion of the body, a pair of spaced ears at the lower rear portion of the body, a roll mounted to rotate freely between the ears, and a guide plate at the base of the central and front portions of the body and having its under face in a plane approximately tangential to the lowermost peripheral portion of the roll.

12. An upper feed roll and guide carrier according to claim 11 including also a manipulating finger projecting angularly of the carrier bearing formation.

13. In a tape dispenser, in combination with a frame, a tape supply support, rotary feed means and operating mechanism therefor including a supporting shaft and an actuating lever having feeding and opposite return motions, a cutter blade pivoted on the frame to swing across the tape path, a trip element comprising a pivoted arm having a dog movably mounted on it, a rigid pivotal link connection between the pivoted arm and the blade, said arm having a rest position in which the blade is clear of the tape path, a cam member supported from said shaft for reciprocating movement with the actuating lever in one direction and the reverse, said cam member adapted to move and inactively pass the dog on feeding motion of the actuating lever and actively to contact the dog on return motion of the said lever thereby to actuate the pivoted arm and the cutter blade, and spring means between the arm and blade acting to oppose their separation and jointly to return the arm to its rest position and the blade to its position clear of the tape path.

14. In a tape dispenser according to claim 13, the construction wherein the operating mechanism includes a crank rockable on the shaft and operatively connected with the actuating lever, an arcuate rack on the frame, and a gear on the crank meshing with the rack so as to be rotated upon rocking of the crank, the blade actuating cam member also being supported by said crank.

15. In a tape dispenser according to claim 13, the construction wherein the spring means comprises a coil spring connected at one end to the movable blade more remotely from its pivot than the link connection therewith, and connected at its other end to the trip element.

16. In a tape dispenser according to claim 13, the construction wherein the spring means comprises a coil spring connected at one end to the movable blade more remotely from its pivot than the link connection therewith, and having its other end connected to the movable dog on the pivoted arm of the trip element whereby the spring additionally serves yieldably to retain the dog in given position for cooperation with the cam member.

17. In a tape dispenser, rotary feed members, an operating lever having feed and return motions, actuating connections between the lever and the feed members including a gear mounted for bodily reciprocation with the operating lever and a stationary rack in mesh with the gear to effect rotation thereof attendant on its reciprocation, spring return means for the lever and gear, a relatively stationary element adjacent the gear, and means on the gear and engageable with said element to halt the lever return motion.

18. In a tape dispenser, a frame providing support for a tape supply, rotary measuring and feeding members for the tape, an operating lever mounted to swing about an axis on the frame, one-way drive connections between the lever and the rotary members, a crank element coaxial and moving with the operating lever, a feed-length selector element supported on the frame for adjustable positioning relative to the crank element, a plurality of stop shoulders on one of said elements and a cooperable stop abutment on the other elements, and means to position the selector element to determine interengagement of the stop abutment and a selected stop shoulder thereby to gauge the tape length to be measured and fed by the rotary members.

19. In a tape dispenser, in combination with a frame, a tape supply support, rotary feed means and operating mechanism therefor including a supporting shaft and an actuating lever having feeding and opposite return motions, a cutter blade pivoted on the frame to swing across the tape path, a blade actuating arm pivoted on the frame, a rigid pivotal link connection between the actuating arm and the blade, the arm having a rest position in which the blade is clear of the tape path, means operatively associating the actuating lever and said arm for actuation of the blade following a feeding motion of the lever, and spring means between the arm and the blade acting to oppose their separation and jointly to return the arm to its rest position and the blade to its position clear of the tape path.

20. In a tape dispenser, rotary feed members, an operating lever having feed and return motions, actuating connections between the lever and the feed members including a gear mounted for bodily reciprocation with the operating lever and a stationary rack in mesh with the gear to effect rotation thereof attendant on its reciprocation, and spring return means for the lever and gear.

21. In a tape dispenser, rotary feed members, an operating lever having feed and return motions, actuating connections between the lever and the feed members including a gear mounted for bodily reciprocation with the operating lever and a stationary rack in mesh with the gear to effect rotation thereof attendant on its reciprocation, spring return means for the lever and gear, and stop means for halting the lever return motion.

22. In a tape dispenser, rotary feed members, an operating lever having feed and return motions, actuating connections between the lever and the feed members including a gear mounted for bodily reciprocation with the operating lever and a stationary rack in mesh with the gear to effect rotation thereof attendant on its reciprocation, spring return means for the lever and gear, and means for stopping rotation of the gear upon completion of the return motion of the operating lever.

23. In a tape dispenser, rotary feed members, an operating lever having feed and return motions, actuating connections between the lever and the feed members including a gear mounted for bodily reciprocation with the operating lever and a stationary rack in mesh with the gear to effect rotation thereof attendant on its reciprocation, spring return means for the lever and gear, and return stop means for the operating lever and for the gear, including a stationary supported buffer element and an engaging member therefor moving with the lever, and including also a relatively stationary element adjacent and engageable with the gear.

24. In a tape dispensing machine, longitudinal frames connected in spaced relation to provide between them a main compartment for a tape roll supply and for actuating mechanism for advancing and cutting off lengths of the tape, a removable side cover plate at the outer face of one of said frames and in laterally spaced relation to form therewith an auxiliary mechanism compartment, a hand lever having a lateral horizontal supporting hub, disengageable operating connections between the lever and said actuating mechanism, an aperture in the cover plate to receive the lever hub, and radial recess and lug formations on the lever hub and on the cover plate at said aperture, thereby demountably to associate the lever and the cover plate as an assembly unit.

25. In a strip serving machine, in combination, a housing including spaced longitudinal frames providing a tape roll chamber, tape feed means including a driven roll and an opposed roll cooperable to advance the tape between them, a pair of shear members transverse of the tape path for severing advanced lengths of tape, one of said members being fixed and the other movable, means providing a guiding channel for the tape between the feed means and the shear members, a trough-like element on the machine housing at the fore end thereof beyond the shear members to receive and deliver severed lengths of tape, a depresser roll adapted to bear on the upper face of the tape forwardly of the shear members, a bottom guide for the tape between the shear members and said trough-like element, said guide having a forward portion rotatably supporting the presser roll and being pivoted on the frames at its rear portion for vertical movement about a horizontal axis closely in advance of the shear members, and an upper tape guide carried by the bottom guide, said guides adapted to conduct the tape below and in tangential relation to the presser roll and having rearwardly divergent rear edge portions to receive the leading end of the tape from the shear members irrespective of the position of the pivoted bottom guide.

26. In a tape dispenser, a housing, means to support a tape supply, shear means in the housing together with feed and guide means to advance tape from the supply past the shear means, a combined guide chute and tape depresser extending forwardly beyond the shear means, and a door-like front member for the housing having its lower end pivotally associated with the latter and having at its upper portion a trough-like element extending rearwardly and inwardly substantially to the tape depresser so as to underlie the tape advanced past the shear means and below the tape depresser.

TREVOR R. GAUTIER.
ROBERT W. HOITT.